UNITED STATES PATENT OFFICE 2,556,233

PROCESS FOR FLAVORING FOODSTUFFS

Hermanus Kornelis Stokla, Rijswijk, and Jan van Dalfsen, Rotterdam, Netherlands, assignors to Lever Brothers Company, New York, N. Y., a corporation of Maine No Drawing. Application September 20, 1948, Serial No. 50,248. In the Netherlands September 22, 1947

7 Claims. (Cl. 99—140)

With flavored foodstuffs the difficulty often arises that the flavoring substance volatilizes or oxidizes during the time between manufacture and ultimate use. For instance, blancmange powders flavored with almond oil will lose their flavor in the course of time. This loss of flavor is accelerated because after blending in the blancmange powder, the almond oil has a large surface which promotes evaporation and oxidation.

In order to limit volatilizing in such cases, the flavorings have been dissolved in liquids which reduce the vapor pressure of the flavorings. Such an effort to prevent loss by evaporation has met with only moderate success. A better effect has been obtained by enclosing all the flavoring in a single capsule and including one capsule in each package of the foodstuff. This method is rather expensive, however, and has the disadvantage that the substance from which the capsule is formed dissolves rather slowly when the product is being treated with the aqueous liquid.

The invention relates to flavored foodstuffs which are prepared for use with the aid of aqueous liquids with or without heating.

According to the invention, the drawbacks mentioned above are overcome by dispersing the flavoring substance in a "liquid stiffener" and subdividing and distributing this dispersion in the foodstuff in such a way that the stiffened dispersion particles in the final food product mostly have a minimum dimension of not less than 0.1 mm. The term "mostly" used here relates to the weight and not the number of the particles, that is, at least 50% of the weight of the stiffened dispersion particles have a minimum dimension of not less than 0.1 mm. In most cases there are advantages in carrying out the distribution of the dispersion in the foodstuff so that the stiffened dispersion particles mostly have a size of about 0.5 to 3 mm., because experiments have shown that in such a case the evaporation or oxidation is sufficiently retarded, while the particles nevertheless dissolve quickly enough when the foodstuffs are prepared for use such as by heating in an aqueous liquid. Also, this size, in most cases, is suitable for obtaining a sufficiently uniform distribution throughout the foodstuff before it is packaged. Moreover, not only spherical particles may be formed but also plates or scales, such as can be obtained by spreading the dispersion on a drum in a layer of at least 0.1 mm. thick and cutting or breaking the layer into small plates otherwise having the size mentioned.

The liquid stiffener preferably is selected so that the flavoring substance forms a separate phase therein and is enveloped by the liquid stiffener. By this means the evaporation of the flavoring is greatly retarded and in instances where the flavorings are subject to alteration in flavor through oxidation, the oxidation is also retarded.

If the flavoring substance to be preserved in the manner described is an oil, such as an essential flavoring oil, the liquid stiffener may be soluble or dispersible in a liquid such as water or alcohol, for example a protein such as gelatine or albumin, or a cellulosic type gum such as agar or gum arabic, or a manufactured material such as methyl cellulose, sodium carboxy-methyl cellulose, and similar natural and synthetically formed substances which dissolve or disperse in water. In such instances the material is stiffened by gelation (forming of a gel), but may stiffen too by evaporation of the solvent. If desired, the liquid stiffener can have sugar, glycerin, or other material added to it to facilitate solution during the preparation or heating of the final foodstuff.

If the flavoring substance to be preserved is an aqueous material, the liquid stiffening agent may be a fatty body such as a fat or wax or other material which can be melted, or dissolved in a solvent, to form a separate phase with the liquid flavoring substance. The liquid stiffener may be selected with reference to the nature of the flavoring substance to be protected and the foodstuffs with which they are to be used. In addition to fat, for instance, highly concentrated molasses may be used. The liquid stiffener should be suitable for dispersing the flavoring substances to be protected in a separate phase so as to enclose them sufficiently when the foodstuffs are kept. But, on the other hand, when the foodstuffs are prepared for use by treating with an aqueous liquid, and if desired with heat, the liquid stiffeners must dissolve or melt so that the substance to be protected can be distributed evenly in the prepared foodstuff together with the liquid stiffener. If desired, the stiffened dispersion particles can be added to the foodstuff while they are damp and when mixed the particles of the powdered foodstuff will then attach themselves to the surface of the dispersion particle which makes them less visible. They can be hardened subsequently by evaporation of the solvent or by cooling if the stiffener has been liquified by melting or is capable of forming a gel.

Because the flavoring substances to be protected in accordance with the invention vary largely in their chemical and physical properties and the protecting medium must necessarily also vary, it is impossible to assign any common chemical class to the liquid stiffeners except that they must be materials which are normally solid or plastic and can be placed in a liquid form, either through solution or through melting, following which the flavoring substance can be dispersed and the dispersion subdivided and transformed into a solid form by evaporation of the liquid or through cooling. It is believed that in view of this explanation the expression "liquid stiffener" as used in the following claims will be clearly understood by those skilled in the art.

The amount of the liquid stiffener varies somewhat in relation to the flavoring substance to be protected, but is not critical provided the protection is obtained.

*Example 1*

(a) A banana essence flavoring in an amount of 0.75 kg. is dispersed by stirring it into a warm mixture formed from 0.25 kg. gelatine, 0.5 kg. sugar and 1 kg. water. The sugar, if desired, may be omitted. The proportions of gelatine may vary and in the case of some essential oil essences, for example, for almond oil, it is preferable to increase the quantity of gelatine to 0.5 kg. After the banana essence is stirred it forms small particles of the inner phase of an emulsion, following which the warm dispersion is forced through a heated, perforated tube having 1 mm. openings. Particles which emerge from the openings consist of small spherical particles of the banana essence having the gelatine coating surrounding them and these particles are dropped on to the blancmange powder to be flavored which has been spread out on a band conveyor and is moving continuously under the perforated tube. The drops of the dispersion fall on the blancmange powder and are covered thereby and set up to small dragées.

(b) As an alternative the dispersion above described may be cooled whereupon it forms a tough mass and by adding solid carbon dioxide (Dry Ice) to the dispersion it is made so stiff that it can be ground coarsely to particles of about 1 mm. size. These may be mixed into the blancmange powder.

(c) The dispersion may also be formed into small particles by means of a cutting machine consisting of a vertical revolving slicer situated in a suitable bowl which revolves slowly about a vertical axis. In accordance with this modification, the dispersion is poured into the bowl of the cutter after about 3 kg. of corn flour have previously been placed in the bowl. When cooled, the dispersion forms a stiff gel. After another 2 kg. of corn flour have been added to avoid caking of the particles the cutter is put into operation. The size of the dispersion particles was checked by sifting which gave: 42% by weight from 2 to 4 mm., 47% by weight from 0.5 to 2 mm., and 11% up to 0.5 mm. The unsifted product is mixed with blancmange powder in the desired amount, for instance in the ratio of 2.5 parts of the unsifted product to 100 parts of the blancmange powder.

Following this example, other essential oils, such as almond oil, may be mixed with other liquid stiffeners such as agar, sodium carboxymethyl-cellulose, etc.

*Example 2*

Fresh lemon juice in an amount of 30 kg. is dispersed in 100 kg. hardened peanut oil (melting point: 38° C.) with an addition of 2% mixed mono- and diglycerides of stearic acid, by running the lemon juice into the melted fat while this is stirred at a temperature at which the fat partly sets to the consistency of gruel. The dispersion is distributed in the way described in Example 1 over a sauce powder for preparing acid sauce.

Following this example, other aqueous materials such as fruit juices, may be dispersed in hydrogenated fats or hard waxes in a similar manner.

It will be obvious that our invention is capable of various modifications and may be applied to various materials, and we intend all such variations to be included within our invention as fall within the scope of the following claims.

We claim:

1. A process for flavoring powdered foodstuffs which are prepared for use by treating with aqueous liquids, during which heat may be applied, which comprises dispersing a flavoring substance in a liquid stiffener in which the substance is substantially insoluble and distributing the dispersion so obtained into particle form before the dispersion is completely hardened, whereby the dispersed substance is coated with liquid stiffener, and distributing said unhardened particulate dispersion into the foodstuff, whereby the particles of the dispersion are coated with the powdered foodstuff to be flavored, said particles mostly having a minimum size of not less than 0.1 mm. and not more than 3.0 mm.

2. The process according to claim 1 in which the liquid stiffener is water-soluble and the flavoring substance is an oil material dispersed within the liquid stiffener as a separate phase.

3. A process in accordance with claim 2 in which the liquid stiffener is gelatine.

4. A process in accordance with claim 1 in which the liquid stiffener is a meltable fatty body and the flavoring substance is an aqueous liquid dispersed within the meltable fatty body as a separate phase.

5. A process according to claim 4 in which the liquid stiffener is a hydrogenated fat having a melting point substantially above ambient temperatures.

6. A process in accordance with claim 1 in which the dispersion is forced through small holes to form separate particles which are mixed directly with the foodstuff to be flavored.

7. A process in accordance with claim 1 in which the dispersion is hardened and subdivided to particles of the requisite size.

HERMANUS KORNELIS STOKLA.
JAN van DALFSEN.

REFERENCES CITED

The following references are of record in the file of this patent:

UNITED STATES PATENTS

| Number | Name | Date |
|---|---|---|
| 2,131,064 | Musher | Sept. 27, 1938 |
| 2,143,651 | Fisher et al. | Jan. 10, 1939 |
| 2,258,567 | Epstein et al. | Oct. 7, 1941 |

FOREIGN PATENTS

| Number | Country | Date |
|---|---|---|
| 28,226 | Great Britain | A. D. 1903 |